ACETYLENIC POLYCARBONATE COPOLYMERS
Lieng-Huang Lee, Midland, Mich., assignor to The Dow Chemical Company, Midland, Mich., a corporation of Delaware
No Drawing. Filed Aug. 29, 1966, Ser. No. 575,554
6 Claims. (Cl. 260—47)

ABSTRACT OF THE DISCLOSURE

Polycarbonate resins having an acetylenic group and an aromatic group in moieties of the polymeric chains and useful for plastic molding are obtainable by reaction of bischloroformates of aromatic dihydroxy compounds with mono-acetylenically unsaturated diols.

---

This application is a continuation-in-part of a copending application, Ser. No. 199,643, filed June 4, 1962, now abandoned. This invention relates to new compositions of matter in polycarbonate resins having acetylenic unsaturation in the polymer molecules.

Among the newer important synthetic polymers are the polycarbonates. These are condensation polymers in which the organic moieties are joined together by carbonate linkages. Many polycarbonates are useful because products made therefrom have high strength, toughness and excellent heat stability. Polycarbonates are, however, very difficult to fabricate because they have high melting points and exceptionally high melt viscosities. Attempts to overcome these difficulties by incorporating with the polycarbonate materials, substances known to plasticize or reduce the viscosity of other polymers have generally been unsuccessful.

Readily moldable polycarbonate resin products having lower melting points and lower melt viscosities are obtained in accordance with this invention in polycarbonate polymers which are copolymers of the bischloroformate of an aromatic dihydroxy compound and an aliphatic dihydroxy compound having an acetylenic linkage as more particularly set out hereinafter. The new copolymers of this invention contain at least one moiety derivable from the bischloroformate of an aromatic dihydroxy compound and at least one moiety derivable from a dihydroxy mono-acetylenically unsaturated compound. These novel copolymers can be made by reacting the bischloroformate of an aromatic dihydroxy compound with a mono-acetylenically unsaturated dihydroxy compound.

The bischloroformates employed in the manufacture of the copolymers of this invention can be produced from a rather large variety of aromatic organic dihydroxy compounds, e.g. by reaction thereof with phosgene. Representative specific examples of such aromatic dihydroxy compounds are hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2'-dihydroxydinaphthyl-1,1' and ortho-, meta- and para-hydroxybenzyl alcohol.

Among the bischloroformates of aromatic dihydroxy compounds, the bischloroformates of di(hydroxyaryl)-alkanes and the di(hydroxyaryl)sulphones are found to be particularly satisfactory. Examples of this class of compounds are the bischloroformates of di(4-hydroxyphenyl)methane,
1,1-di(4-hydroxyphenyl)ethane,
1,1-di(4-hydroxyphenyl)propane,
1,1-di(4-hydroxyphenyl)butane,
1,1-di(4-hydroxyphenyl)-2-methylpropane,
1,1-di(4-hydroxyphenyl)heptane and
4,4'-dihydroxytriphenylmethane.

Furthermore, di(4-hydroxyphenyl)-4-methylphenylmethane,
di(4-hydroxyphenyl)-4-ethylphenylmethane,
di(4-hydroxyphenyl)-4-isopropylphenylmethane,
di(4-hydroxyphenyl)-4-butylphenylmethane,
di(4-hydroxyphenyl)benzylmethane,
di(4-hydroxyphenyl)-α-furylmethane,
2,2-di(4-hydroxyphenyl)propane,
2,2-di(4-hydroxyphenyl)butane,
2,2-di(4-hydroxyphenyl)pentane,
2,2-di(4-hydroxyphenyl)-4-methylpentane,
2,2-di(4-hydroxyphenyl)heptane,
2,2-di(4-hydroxyphenyl)octane,
2,2-di(4-hydroxyphenyl)nonane,
1,1-di(4-hydroxyphenyl)-1-phenylethane,
3,3-di(4-hydroxyphenyl)pentane,
1,1-di(4-hydroxyphenyl)cyclopentane,
1,1-di(4-hydroxyphenyl)cyclohexane,
2,2-di(4-hydroxyphenyl)decahydronaphthalene,
2,2-di(4-hydroxycyclohexyl)propane,
2-(4-hydroxy-3-methylphenyl)-2-(4-hydroxyphenyl)-propane,
2-(4-hydroxy-3-isopropylphenyl)-2-(4-hydroxyphenyl)-butane,
1,1-di(4-hydroxy-3-methylphenyl)cyclohexane,
2,2-di(4-hydroxy-3-butylphenyl)propane,
2,2-di(4-hydroxy-3-phenylphenyl)propane,
2,2-di(4-hydroxy-2-methylphenyl)propane,
1,1-di(4-hydroxy-3-methyl-6-butylphenyl)butane,
1,1-di(4-hydroxy-3-methyl-6-tert.butylphenyl)ethane,
1,1-di(4-hydroxy-3-methyl-6-tert.butylphenyl)propane,
1,1-di(4-hydroxy-3-methyl-6-tert.butylphenyl)butane,
1,1-di(4-hydroxy-3-methyl-6-tert.butylphenyl)isobutane,
1,1-di(4-hydroxy-3-methyl-6-tert.butylphenyl)heptane,
1,1-di(4-hydroxy-3-methyl-6-tert.butylphenyl)-1-phenylethane,
1,1-di(4-hydroxy-3-methyl-6-tert.butylphenyl)-2-methylpentane,
1,1-di(4-hydroxy-3-methyl-6-tert.butylphenyl)-2-ethylhexane,
1,1-di(4-hydroxy-3-methyl-6-tert.amylphenyl)butane,
di(4-hydroxyphenyl)sulphone,
di(2-hydroxyphenyl)sulphone,
di(3-hydroxyphenyl)sulphone,
di(4-hydroxy-2-ethylphenyl)sulphone,
di(4-hydroxy-3-ethylphenyl)sulphone,
di(4-hydroxy-2-tert.butylphenyl)sulphone,
di(4-hydroxy-3-tert.butylphenyl)sulphone and
di(2-hydroxynaphthyl)sulphone.

Among the bischloroformates of di(hydroxyaryl)-alkanes, given above, the di(4-hydroxyphenyl)alkanes are preferable, especially the bischloroformates of 2,2-di-(4-hydroxyphenyl)propane. Copolymers having special properties can be prepared from mixtures of two or more bischloroformates of aromatic dihydroxy compounds.

In making the present polycarbonate resins therefrom, the bischloroformate of an aromatic dihydroxy compound is reacted with a mono-acetylenically unsaturated compound corresponding to the structural formula

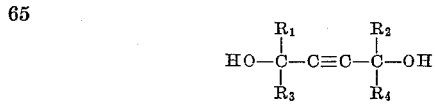

in which each of $R_1$, $R_2$, $R_3$ and $R_4$ is independently selected from the group consisting of hydrogen, methyl and ethyl. Representative specific illustrative examples of such compounds are 1,4-dihydroxy-2-butyne,
1,4-dihydroxy-1-methyl-2-butyne,
1,4-dihydroxy-1,4-dimethyl-2-butyne,
1,4-dihydroxy-1,1-dimethyl-2-butyne,
1,4-dihydroxy-1,1,4-trimethyl-2-butyne,
1,4-dihydroxy1,1,4,4-tetramethyl-2-butyne,
1,4-dihydroxy-1-ethyl-2-butyne,
1,4-dihydroxy-1,1-diethyl-2-butyne,
1,4-dihydroxy-1,4-diethyl-2-butyne,
1,4-dihydroxy-1-methyl-4-ethyl-2-butyne,
1,4-dihydroxy-1-methyl-1-ethyl-2-butyne and the like.

Instead of, or in addition to, the monomeric bischloroformates above referred to, there can be utilized polycarbonate prepolymers formed, for example, by phosgenation of an aromatic dihydroxy compound of the kinds described hereinabove.

The polymers of this invention have the structure

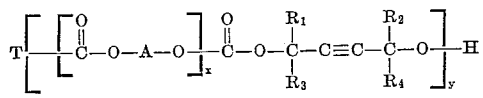

in which —O—A—O— is the residue of the removal of hydroxy hydrogens from an aromatic dihydroxy compound, e.g., of the types presented above, $R_1$, $R_2$, $R_3$ and $R_4$ are each independently selected from the group consisting of hydrogen, methyl and ethyl, each of $x$ and $y$ is a positive integer having a value of at least 1, with the further limitation that at least one of $x$ and $y$ is a positive integer having a value of at least 2. When polycarbonate prepolymers are employed as indicated above, $x$ can have a value typically in the neighborhood of from 5 to about 20, for example, 10. The resinous polymers of this invention have molecular weights of at least about 2,000. T is a conventional end group of polycarbonate resin polymer molecules such as chloro (from the chloroformyloxy group of the starting bischloroformate reactant), hydroxy (from hydrolysis of a chloroformyloxy group), or the residue of a monofunctional compound which has been reacted with a chloroformyloxy group to replace the chloro group thereof, such as the residue of a phenol, an alcohol, an amino alcohol, a fluoro-alcohol, a silane, a mercaptan, an amine, etc., employed in the preparation of the polycarbonates in a manner known in the art to regulate the molecular weight of the polycarbonates and to further modify their properties.

Throughout this specification, parts and percentages are parts and percentages by weight unless otherwise specified. The samples which follow are illustrative of this invention but the invention is not limited to the details thereof.

EXAMPLE I

A 4.3 gram portion of 1,4-dihydroxy-2-butyne is dissolved in a caustic solution containing 5 grams of sodium hydroxide and 50 milliliters of water. To the solution thus formed are added 17.6 grams of 4,4'-isopropylidenediphenyl bis(chloroformate) and 40 milliliters of methylene chloride. There is then added to catalyze the reaction, 0.4 milliliter of a 65 percent aqueous solution of benzyltrimethylammonium chloride. The reactants are maintained at a temperature of 25° C. and stirred for one hour. The methylene chloride layer is separated from the aqueous layer by means of a separatory funnel and the polymer is precipitated by pouring the methylene chloride solution thereof into methyl alcohol. The polymer is separated from the supernatant liquid by decantation and filtration and dried in vacuo at 100° C. This polymer is white, melts at 140°–142° C., has repeating units of the structure

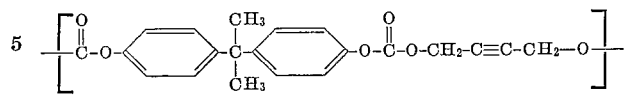

and a Fikentscher K value of 38. A melt of the polymer is light tan in color.

EXAMPLE II

Two grams of 1,4-dihydroxy-2-butyne is dissolved in a solution of 4 grams of sodium hydroxide and 30 milliliters of water. 8.0 grams of a low molecular weight polycarbonate of the formula

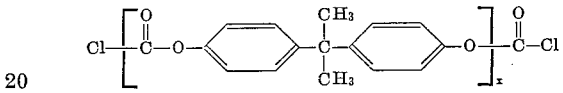

in which $x$ has an average value of about 10, is added to the above solution. Five drops of a 65 percent aqueous solution of benzyltrimethylammonium chloride are added as a catalyst. The mixture is stirred for 30 minutes and the polymer is recovered as in Example I.

In a manner similar to the foregoing examples, polycarbonate resins containing acetylenic bonds within the polymer chain can be made by reacting an alkyl substituted 1,4-dihydroxy-2-butyne with a bischloroformate of aromatic dihydroxy compound. For example, 1-methyl-1,4-dihydroxy-2-butyne can be reacted with any one or more of the bischloroformates of aromatic dihydroxy compounds, such as the bischloroformate of 4,4'-methylenediphenol; 1,4-dihydroxy-1,4-dimethyl-2-butyne can be reacted with the bischloroformate of 4,4'-ethylidenediphenol and so forth to produce polymers of the types made in the preceding examples. In place of the monomeric bischloroformates, there can be used to react with a dihydroxybutyne a bischloroformate terminated polycarbonate prepolymer of an aromatic dihydroxy compound, formed for example, by phosgenation of an aromatic dihydroxy compound, in the manner of Example II, supra, to obtain polymers within the purview of this invention.

The polymers of this invention can be formed into sheets, blocks and other shaped articles by standard molding techniques and can be employed as adhesives and coating compositions. For example, the polymer can be dissolved in a solvent, the solution deposited upon a substrate as by brushing, spraying or dipping and the solvent removed by vaporization. Such coatings have good corrosion inhibition properties.

The polymers of the present invention can be utilized in relatively pure form or, alternatively, they can be admixed with dyes, pigments, lubricants, plasticizers, antioxidants, ultraviolet light absorbers, stabilizers, fillers and the like to produce special effects.

What is claimed is:

1. A polycarbonate resin having a molecular weight in excess of about 2000 and the structural formula

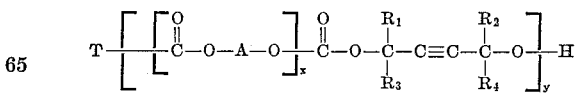

in which —O—A—O— is the residue of the removal of hydroxy hydrogens from an aromatic dihydroxy compound, each of $R_1$, $R_2$, $R_3$ and $R_4$ is independently selected from the group consisting of hydrogen, methyl and ethyl, $x$ and $y$ are positive integers having a value of at least 1 and one of $x$ and $y$ is at least 2, and T is an end group selected from chloro, hydroxyl, and the residue of a monofunctional compound which has been reacted with a chloroformyloxy group to replace the chloro group thereof.

2. A polycarbonate resin in accordance with claim 1 wherein each of $R_1$, $R_2$, $R_3$ and $R_4$ is hydrogen.

3. A polycarbonate resin in accordance with claim 1 having the structural formula

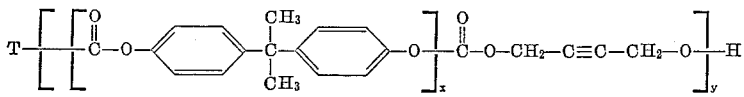

4. A polycarbonate resin in accordance with claim 3 wherein $x$ is about 10.

5. A polycarbonate resin in accordance with claim 3 wherein $x$ is 1 and $y$ is at least 20.

6. A polycarbonate resin in accordance with claim 5 wherein T is chloro.

References Cited by the Examiner

UNITED STATES PATENTS

| | | | |
|---|---|---|---|
| 2,162,676 | 6/1939 | Macallum | 260—635 |
| 2,163,720 | 6/1939 | Vaughn | 260—635 |
| 2,563,771 | 8/1951 | Adelson | 260—77.5 |
| 2,964,797 | 12/1960 | Peilstöcker | 260—47 X |
| 2,997,459 | 8/1961 | Schnell et al. | 260—77.5 |

OTHER REFERENCES

N. Rabjohn et al.: J. Am. Chem. Soc., 74, pp. 3215–3216 (1952).

WILLIAM H. SHORT, *Primary Examiner.*

LOUISE P. QUAST, *Examiner.*